(12) United States Patent
Cui et al.

(10) Patent No.: US 12,110,377 B1
(45) Date of Patent: Oct. 8, 2024

(54) AEROGEL WITH HIERARCHICAL PORE STRUCTURE FORMED USING PULSED LASER TECHNOLOGY, AND PREPARATION METHOD AND USE THEREOF

(71) Applicant: Ocean University of China, Qingdao (CN)

(72) Inventors: Hongzhi Cui, Qingdao (CN); Ruiqi Xu, Qingdao (CN); Na Wei, Qingdao (CN); Minggang Zhao, Qingdao (CN); Aiping Wang, Qingdao (CN); Jun Zhao, Qingdao (CN)

(73) Assignee: Ocean University of China, Qingdao (CN)

( * ) Notice: Subject to any disclaimer, the term of this patent is extended or adjusted under 35 U.S.C. 154(b) by 0 days.

(21) Appl. No.: 18/524,186

(22) Filed: Nov. 30, 2023

(30) Foreign Application Priority Data

Mar. 27, 2023 (CN) .......................... 202310303307.8

(51) Int. Cl.

| | | |
|---|---|---|
| *C08J 9/28* | (2006.01) | |
| *B23K 26/0622* | (2014.01) | |
| *B23K 26/382* | (2014.01) | |
| *B23K 26/402* | (2014.01) | |
| *C02F 1/14* | (2023.01) | |
| *C08J 3/075* | (2006.01) | |
| *C08J 3/21* | (2006.01) | |
| *C08J 9/36* | (2006.01) | |
| *C08K 3/34* | (2006.01) | |
| *C08L 5/12* | (2006.01) | |
| *F24S 70/16* | (2018.01) | |
| *C02F 103/08* | (2006.01) | |

(52) U.S. Cl.
CPC ........... *C08J 9/283* (2013.01); *B23K 26/0622* (2015.10); *B23K 26/389* (2015.10); *B23K 26/402* (2013.01); *C02F 1/14* (2013.01); *C08J 3/075* (2013.01); *C08J 3/212* (2013.01); *C08J 9/36* (2013.01); *C08K 3/34* (2013.01); *C08L 5/12* (2013.01); *F24S 70/16* (2018.05); *C02F 2103/08* (2013.01); *C08J 2201/0484* (2013.01); *C08J 2205/026* (2013.01); *C08J 2205/04* (2013.01); *C08J 2305/12* (2013.01); *C08J 2429/04* (2013.01); *C08K 2201/001* (2013.01); *C08K 2201/011* (2013.01); *C08L 2203/14* (2013.01); *C08L 2312/00* (2013.01)

(58) Field of Classification Search
CPC ..... C08J 9/283; C08J 9/36; C08J 3/075; C08J 3/212; C08J 2201/0484; C08L 2312/10; B23K 26/402; C09K 3/34; C09K 2201/001
See application file for complete search history.

(56) References Cited

U.S. PATENT DOCUMENTS

| | | | |
|---|---|---|---|
| 2012/0325737 A1* | 12/2012 | Lee ..................... | B29C 44/3415 521/189 |
| 2014/0210118 A1* | 7/2014 | Lee ..................... | B01D 67/0002 264/28 |

FOREIGN PATENT DOCUMENTS

| | | | | |
|---|---|---|---|---|
| CN | 109243849 A | | 1/2019 | |
| CN | 110064347 A | | 7/2019 | |
| CN | 113072335 A | * | 7/2021 | ............. C04B 28/04 |
| CN | 113578282 A | | 11/2021 | |
| CN | 113952900 A | * | 1/2022 | ............. B01J 13/00 |
| CN | 114180582 A | * | 3/2022 | ........... C01B 33/158 |
| CN | 114316375 B | * | 12/2022 | ................ C08L 1/04 |
| CN | 115590521 A | * | 1/2023 | ............. A61B 5/266 |
| CN | 117577818 A | * | 2/2024 | ............. H01M 4/36 |
| RU | 2738607 C1 | * | 12/2020 | ................ C08F 8/00 |

* cited by examiner

*Primary Examiner* — Jane L Stanley
(74) *Attorney, Agent, or Firm* — Jacob M. Ward; Ward Law Office LLC (57) ABSTRACT

Disclosed are an aerogel with a hierarchical pore structure formed using a pulsed laser technology, and a preparation method and use thereof. In the preparation method, a nano silicon-containing inorganic material as a freezing element, a biomass polymer as a cross-linking agent, and deionized water as a solvent are mixed and a resulting mixture is left to stand and gelatinized to obtain a hydrogel; the hydrogel is frozen to form ice crystals therein, and the ice crystals are removed by freeze-drying to obtain a micron-nano porous aerogel; the micron-nano porous aerogel is subjected to customized millimeter-scale punching using a pulsed laser to obtain an aerogel with a millimeter-micron-nano hierarchical pore structure.

8 Claims, 10 Drawing Sheets

AEROGEL WITH HIERARCHICAL PORE STRUCTURE FORMED USING PULSED LASER TECHNOLOGY, AND PREPARATION METHOD AND USE THEREOF

CROSS REFERENCE TO RELATED APPLICATION

This patent application claims the benefit and priority of Chinese Patent Application No. 202310303307.8 filed with the China National Intellectual Property Administration on Mar. 27, 2023, the disclosure of which is incorporated by reference herein in its entirety as part of the present application.

TECHNICAL FIELD

The present disclosure belongs to the technical field of aerogel material preparation, especially aerogel materials for conversion and utilization of solar energy. The present disclosure specifically relates to a preparation method and use of a silicon-containing inorganic-organic composite aerogel with a hierarchical pore structure of vertically-oriented millimeter-scale pores and three-dimensionally-connected micron-nano pores.

BACKGROUND

With the increasing consumption of non-renewable energy, energy transformation with renewable energy has become an important development trend in the future. Solar energy is rich in resources, environmentally friendly, clean, and pollution-free. Replacing the consumption of part fossil energy through the utilization and conversion of solar energy is of great significance for environmental protection and sustainable development. It is an important way to realize the practical application of solar energy by designing and developing a solar-energy converting and utilizing material that is lightweight and efficient and could be produced on a large scale.

Aerogel materials have excellent characteristics such as low linear density, light weight, low thermal conductivity, large specific surface area, and high porosity, and are widely used in life and production. The aerogel material is generally formed under supercritical drying or freeze-drying conditions, and has a three-dimensional porous network framework structure; its pore structure characteristics are generally affected by the freezing element and cross-linking strength. Generally, the strength of aerogel is ensured by chemical cross-linking or physical cross-linking. The chemical cross-linking refers to forming a covalent bond through polycondensation or copolymerization of a monomer triggered by a chemical cross-linking agent, thereby constructing a three-dimensional network structure. The physical cross-linking refers to combining and cross-linking through physical forces, such as hydrogen bonds, coordination bonds, Van der Waals' force, and intermolecular entanglement, thereby forming a three-dimensional polymer network. Cross-linking agents with different characteristics could be selected to regulate the pore structure and cross-linking strength of aerogels to meet the requirements of various service environments. Polyvinyl alcohol, rich in hydroxyl groups, is a widely-used water-soluble polymer, and has excellent film-forming properties, thermal stability, adhesion, wear resistance, self-healing properties, and desirable mechanical strength. Moreover, polyvinyl alcohol also shows outstanding biocompatibility, biodegradability, and non-toxic and harmlessness, and exhibits unique advantages in the field of environmental protection. As a desirable biocompatible polysaccharide, agar contains rich carboxyl groups, could be dissolved in water at a temperature of 90° C. and solidified at room temperature, and has excellent recyclability. Therefore, appropriate cross-linking agents could be selected to effectively improve the cross-linking strength of the aerogels according to multiple cross-linking mechanisms.

Aerogel materials have characteristics of a controllable pore structure and high porosity, and when used in the field of solar-driven water evaporation, these materials not only provide a considerable light-absorbing area for solar light absorption, but also provide abundant channels for water transmission and steam escape. Accordingly, the aerogel materials show broad application prospects in the fields of solar-driven interfacial water evaporation for seawater desalination, sewage treatment, and photothermal catalysis. However, aerogels generally have mesopores with a pore size of 2 nm to 50 nm inside. Aerogels with a single pore structure have many limitations in water transmission, light absorption, heat conduction, and energy utilization. In contrast, aerogels with a hierarchical pore structure could undoubtedly provide a larger specific surface area for solar light absorption, and could exert a capillary action to improve the water supply rate by pore size control. In addition, by constructing a straight through-pore structure inside the aerogel, a surface tension gradient could be formed due to a longitudinal salt concentration difference. In this way, the Marangoni effect is exerted to promote the migration of salt ions, thereby realizing the anti-salt precipitation functional design of the aerogel materials. Moreover, the synergistic utilization of light absorption and substance exchange capability of a millimeter-micron-nano hierarchical pore structure allows for more application potentials of the aerogels in environmental protection fields such as seawater desalination, sewage treatment, and air purification. As a result, the pore size distribution and pore structure of aerogels need to be further controlled and optimized to ensure their structural properties while achieving multifunctionality.

Currently, the more mature aerogels include polymer-based aerogels and biomass aerogels. However, this type of organic aerogel is flammable, and its pore-making technology and application are severely limited, making it difficult to precisely control and optimize the pore size. Among the reported methods for constructing hierarchical pore structures, one or two pore-making methods are generally adopted in combination. For example, CN109243849A discloses a method for preparing a nitrogen-doped graphene aerogel with a hierarchical pore structure. In the method, $CaCO_3$@polydopamine particles were used as a template, and then $CaCO_3$ is removed by acid pickling to form pores. However, in this method, a template agent was introduced, which not only requires subsequent steps to remove the template agent, thereby resulting in a complicated process, and also is not conducive to controlling the shape and structure of pores. CN201910435537.3 discloses an inorganic nanofiber/organic polymer composite aerogel prepared by a freeze casting molding method. The composite aerogel had a "layer-stack-layer" structure, but could only provide micron-scale channels and had certain limitations in terms of water and air flux as well as substance exchange and transfer. CN202110865371.6 discloses a method for preparing an aerogel material by an emulsion template process. This method, however, is weak in regulating the pore size distribution and pore structure of the aerogel, and is difficult to accurately control the number and distribution of various pore types. In view of this, there is an urgent need to develop a technology for preparing an aerogel with optimized pore sizes and a hierarchical pore structure, which does not require a pore-forming agent template, has a simple process and efficient preparation procedures, and could accurately control the pore structure characteristics and distribution. It is of great significance for further improving the efficiency of solar-driven water evaporation and expanding the scope of applications.

SUMMARY

In order to accurately control the pore structure characteristics and distribution of the aerogel, the present disclosure provides an aerogel with a hierarchical pore structure formed using a pulsed laser technology. This aerogel has three-level pore size, namely millimeter size, micron size, and nanometer size simultaneously, and a pore-forming agent template is not required during the preparation.

The present disclosure further provides a preparation method and use of the aerogel.

In order to achieve the above object, an overall idea of the technical solutions adopted in the present disclosure is as follows: a nano silicon-containing inorganic material is used due to its high melting point, excellent high-temperature stability, and high-temperature oxidation resistance; polyvinyl alcohol, agar, and glutaraldehyde are used as a cross-linking agent, and physical and chemical cross-linking mechanisms such as hydrogen bonding and condensation polymerization are adopted to prepare the silicon-containing nano-inorganic-organic porous double-network composite aerogel. This aerogel makes it possible to ensure mechanical properties through the strength and toughness of polymer materials, and also improve the hardness and flame retardancy of polyvinyl alcohol/agar aerogel by virtue of characteristics of inorganic materials. Moreover, besides enhanced ablation resistance, the aerogel shows a processing diversity. Based on the silicon-containing nano-inorganic-organic aerogel with flame retardance, an aerogel with a simple and efficient preparation process, with precise control of the number and distribution of millimeter-scale pores, and a customizable pore pattern is developed using a pulsed laser with characteristics of high pulse energy and processing efficiency.

The specific technical solutions are as follows: an aerogel with a hierarchical pore structure formed using the pulsed laser technology, which is a silicon-containing inorganic-organic composite aerogel with a millimeter-micron-nano hierarchical pore structure, formed by subjecting a micron-nano silicon-containing inorganic-organic composite aerogel to customized millimeter-scale punching using a pulsed laser technology, wherein the micron-nano silicon-containing inorganic-organic composite aerogel is prepared by a process comprising mixing a nano silicon-containing inorganic material as a freezing element, a biomass polymer as a cross-linking agent, and deionized water as a solvent to obtain a mixture, leaving the mixture to stand, and gelatinizing to obtain a silicon-containing inorganic-organic composite hydrogel; and freezing the silicon-containing inorganic-organic composite hydrogel to form ice crystals therein, and removing the ice crystals therein by freeze-drying to obtain the micron-nano silicon-containing inorganic-organic composite aerogel, and wherein a size, a shape, and a number of the millimeter-scale pores in the aerogel with the hierarchical pore structure are designed by virtue of the pulsed laser's characteristics of rapidness, high energy, and punching pattern designability, thereby obtaining the silicon-containing inorganic-organic composite aerogel with the millimeter-micron-nano hierarchical pore structure that has a controllable process and meets requirements of multiple scenarios and complex service environments.

In some embodiments, the nano silicon-containing inorganic material includes but not limited to at least one of $MoSi_2$, $SiO_2$, and $Si_3N_4$.

In some embodiments, the cross-linking agent at least includes polyvinyl alcohol, agar, and glutaraldehyde.

The present disclosure further provides a method for preparing the aerogel with the hierarchical pore structure formed using the pulsed laser technology as described above, including the following steps:

step 1, preparation of the silicon-containing inorganic-organic composite hydrogel:

providing polyvinyl alcohol and agar, adding deionized water thereto, dissolving the polyvinyl alcohol and the agar by heating to obtain a homogeneous solution; and adding a glutaraldehyde solution into the homogeneous solution, and subjecting a resulting mixture to cross-linking to obtain a cross-linked solution; adding a nano silicon-containing inorganic powder into the cross-linked solution to obtain a uniform silicon-containing inorganic-organic composite colloidal sol; and leaving the uniform silicon-containing inorganic-organic composite colloidal sol to stand, and gelatinizing to obtain the silicon-containing inorganic-organic composite hydrogel with a certain toughness;

step 2, preparation of the micron-nano silicon-containing inorganic-organic composite aerogel:

freezing the silicon-containing inorganic-organic composite hydrogel obtained in step 1 to form the ice crystals therein, and vacuum freeze-drying to obtain the micron-nano silicon-containing inorganic-organic composite aerogel; and step 3, synthesis of the silicon-containing inorganic-organic composite aerogel with a millimeter-micron-nano hierarchical pore structure:

subjecting the micron-nano silicon-containing inorganic-organic composite aerogel to punching processing using the pulsed laser technology to form a millimeter-scale pore structure, wherein the punching processing is performed by:

setting a pulsed laser with a frequency of 20, a pulse-width of 5,000, a scanning speed of 50 mm/s to 150 mm/s, a laser power of 3% to 8%, and a laser spot of 1 mm; designing a millimeter-scale pore shape and programming for matrix punching; and punching the micron-nano silicon-containing inorganic-organic composite aerogel from top to bottom using a laser light source to form the millimeter-scale pores, wherein the size, the shape, and the number of the millimeter-scale pores in the aerogel with the hierarchical pore structure are designed by virtue of the pulsed laser's characteristics of high efficiency, rapidness, high energy, and punching pattern designability, thereby forming the silicon-containing inorganic-organic composite aerogel with the millimeter-micron-nano hierarchical pore structure that has a vertically-oriented millimeter-scale pore shape and an adjustable porosity.

In principle, the size of millimeter-scale pores is not limited, and could be controlled by self-programming. The number of millimeter-scale pores is determined by the pore density and the area of aerogel, and could be controlled by a self-programming without any restrictions. In some embodiments, the porosity is greater than 98%.

In some embodiments, the silicon-containing inorganic-organic composite colloidal sol includes 1 wt % to 4 wt % of the polyvinyl alcohol, 1 wt % to 2 wt % of the agar, and 0.02 wt % to 1 wt % of the nano silicon-containing inorganic powder.

In some embodiments, the glutaraldehyde solution has a concentration of 50 wt %.

In some embodiments, the silicon-containing inorganic-organic composite hydrogel is frozen at a temperature of −30° C. to −80° C. A lower freezing temperature would result in a smaller pore size, while a higher freezing temperature would result in a larger pore size.

In some embodiments, the millimeter-scale pore shape includes but not limited to at least one of a square, a circle, and a polygon. A distribution pattern of the millimeter-scale pores is not limited.

In the present disclosure, the aerogel with a hierarchical pore structure formed using the pulsed laser technology could be used for solar-driven seawater desalination. The use method includes combining the aerogel with a polystyrene foam and a fiber absorbent paper, and assembling an evaporator, wherein the silicon-containing inorganic-organic composite aerogel absorbs and converts solar energy, to evaporate seawater for obtaining fresh water; the polystyrene foam serves as a thermal insulation layer for thermal management and suppresses heat conduction loss during photothermal evaporation; and the hydrophilic fiber paper transports seawater through capillary force.

A test method for the seawater desalination rate of the evaporator includes: placing the evaporator on an analytical balance and illuminating with a simulated xenon light source; continuously recording mass changes of the evaporator at different times through a computer connected to the balance, monitoring a mass loss, and calculating an evaporation rate.

Compared with the prior art, some embodiments of the present disclosure have the following beneficial effects:

(1) In the present disclosure, polyvinyl alcohol, agar, and glutaraldehyde are used as a cross-linking agent. Because the polyvinyl alcohol has a large number of hydroxyl functional groups on its molecular chain, and the agar contains a large number of carboxyl functional groups, hydrogen bonds would be formed from the hydroxyl groups and carboxyl groups between molecular chains, thereby forming a physical cross-linked network. Also, the carboxyl groups and aldehyde groups could undergo a polycondensation reaction to form a covalent bond, thereby forming a chemical cross-linked network. The double network structures could not only form a stable three-dimensional porous structure during the freeze-drying, but also further improve a strength of the aerogel. These characteristics not only help to ensure the macro formability of the aerogel and avoid its volume shrinkage, but also improve compressive strength, anti-swelling performance, and achieve excellent mechanical properties.

(2) In the present disclosure, during the preparation of the inorganic-organic composite aerogel, the addition of a nano silicon-containing inorganic material improves flame-retardance of the aerogel, thereby endowing the aerogel with pulsed laser processability. Compared with the existing technology, customized and optimized control of the millimeter-scale pores in the aerogel is achieved using shock of the pulsed laser, which is not limited by a size and a shape of a template. Diversified designs of the millimeter-scale pores could be realized through simple programming. The method has simple operations, a stable process, and a desirable reproducibility; and the method is also convenient, efficient, low-cost, green, and pollution-free, and has a wide range of pore structure control. Through the method, precise structural matching design could be made according to different usage scenarios. The aerogel thus has desirable commercial application prospects in many fields, and shows a potential for large-scale promotion and application.

(3) In the present disclosure, a silicon-containing inorganic-organic composite aerogel with a vertically-oriented and three-dimensionally-connected millimeter-micron-nano hierarchical pore structure is obtained by compounding multi-component materials and combining same with an ingenious hierarchical pore structure design. The final composite aerogel has optimized pore size distribution, increased specific surface area, improved swelling resistance, improved water transmission performance and substance exchange efficiency, and enhanced self-cleaning function. In this way, this composite aerogel exhibits a desirable evaporation rate in the field of solar-driven seawater desalination, and thus shows application prospects in the field of solar energy conversion and utilization, including but not limited to seawater desalination and sewage treatment.

BRIEF DESCRIPTION OF THE DRAWINGS

To describe the technical solutions of the present disclosure more clearly, the following briefly introduces the accompanying drawings required for describing the embodiments.

Apparently, the accompanying drawings in the following descriptions show merely some embodiments of the present disclosure, and those of ordinary skill in the art may still derive other drawings from these accompanying drawings without creative efforts.

FIGS. 3A to 3D show scanning electron microscope (SEM) images of the $MoSi_2$ aerogel with a hierarchical pore structure in Example 1 of the present disclosure, in which.

DETAILED DESCRIPTION OF THE EMBODIMENTS

The preferred embodiments of the present disclosure will be described in detail below with reference to the accompanying drawings, so that the advantages and features of the present disclosure can be more easily understood by those skilled in the art, and thus the protection scope of the present disclosure can be defined more clearly.

It should be noted that the original MoSi$_2$ aerogel in the present disclosure refers to a micron-nano MoSi$_2$ aerogel without pulsed laser punching.

Example 1

Figure 1:
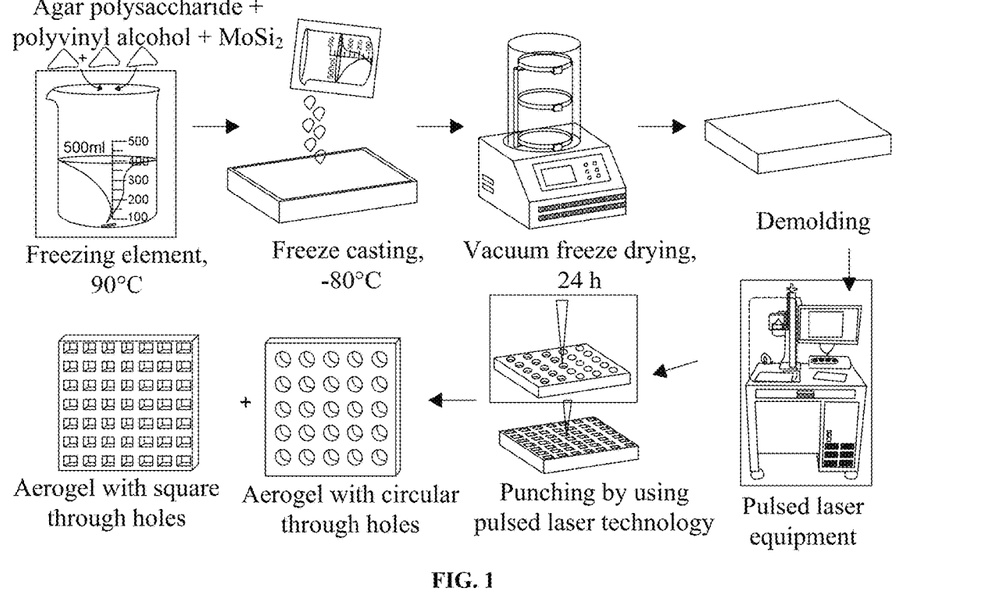
FIG. 1 shows a schematic flowchart for preparing a $MoSi_2$ aerogel with a millimeter-micron-nano hierarchical pore structure in an embodiment of the present disclosure.

In Example 1, a MoSi$_2$ aerogel with a macroscopic pore of 5*5 circular pore matrix was prepared. As shown in FIG. 1, the MoSi$_2$ aerogel with a millimeter-micron-nano hierarchical pore structure was prepared according to the following procedures:

Step 1, preparation of a MoSi$_2$ hydrogel:
2 wt % agar and 1 wt % polyvinyl alcohol powder were placed in a beaker, and dissolved in 100 mL of deionized water by heating to 90° C. and magnetically stirring for 1 h, obtaining a homogeneous solution. 100 μL of a glutaraldehyde solution with a concentration 50 wt % was added to the homogeneous solution and the resulting mixture was stirred for 10 min. A MoSi$_2$ powder with a mass fraction of 0.02 wt % was slowly added thereto and the resulting mixture was magnetically stirred until a uniform black solution was obtained.
The black solution was poured into a prefabricated mold with a dimension of 100 mm*100 mm*10 mm, left to stand for 5 min and gelled, thereby forming the MoSi$_2$ hydrogel with a certain toughness.

Step 2, preparation of a MoSi$_2$ aerogel with a micro-nano pore structure:
The MoSi$_2$ hydrogel obtained in step 1 was frozen in a refrigerator at −80° C. for 24 h, forming ice crystals. The frozen hydrogel was taken out and placed in a freeze dryer at −80° C. and vacuum dried for 48 h, obtaining the MoSi$_2$ aerogel with a micro-nano pore structure.

Step 3, synthesis of a MoSi$_2$ aerogel with a millimeter-micron-nano hierarchical pore structure:
The aerogel obtained in step 2 was cut, obtaining a square aerogel with a dimension of 30 mm*30 mm. The micron-nano-scale MoSi$_2$ aerogel was subjected to punching processing customized with a millimeter-scale pore pattern using a pulsed laser. The punching processing customized with a millimeter-scale pore pattern was performed as follows: the pulsed laser was set with a frequency of 20, a pulse-width of 5,000, a scanning speed of 100 mm/s, and a laser power of 8%; the pore shape was set to be a circle with a diameter of 1 mm, and the pore spacing was set, thereby designing and programming a 5*5 circular pore matrix; the pulsed laser was started, and the MoSi$_2$ aerogel was punched from top to bottom using a laser light source, forming millimeter-scale pores. After punching for 30 s, the punching processing was completed, obtaining a MoSi$_2$ aerogel with a P5×5 pattern shown in FIG. 2, millimeter-scale pores including vertically-oriented through pores, and three-dimensionally-connected micron-nano hierarchical pores shown in FIGS. 3A to 3D.

Use in Photothermal Seawater Desalination
After testing, the MoSi$_2$ aerogel with P5×5 hierarchical pores in Example 1 had a water evaporation rate of 1.39 kg·m$^{-2}$·h$^{-1}$.

Example 2

In Example 2, a MoSi$_2$ aerogel with millimeter-scale pores of a 6*6 circular pore matrix was prepared. It was prepared according to procedures as described in Example 1, except that: in step 3 of this example, a 6*6 circular pore matrix rather than a 5*5 circular pore matrix of Example 1 was designed and programmed, with other parameters of the pulsed laser and operating steps unchanged, to verify the number adjustability of the millimeter-scale pores in the aerogel according to the present disclosure with a proviso that the macroscopic shape did not collapse. An aerogel was obtained with a hierarchical pore structure of P6×6 mm pore shown in FIG. 2.

After testing, the MoSi$_2$ aerogel with P6×6 hierarchical pores in Example 2 had a water evaporation rate of 1.26 kg·m$^{-2}$·h$^{-1}$.

Example 3

In Example 3, a MoSi$_2$ aerogel with macroscopic pores of a 7*7 square pore matrix was prepared. It was prepared according to the procedures as described in Example 1, except that: in step 3 of this example, a 7*7 square pore matrix rather than a 5*5 circular pore matrix of Example 1 was designed and programmed, with other parameters of the pulsed laser and operating steps unchanged, to verify that the millimeter-scale pore pattern of the aerogel according to the present disclosure could be accurately customized. An aerogel was obtained with a hierarchical pore structure of millimeter-scale pores in P7×7 mm pore size shown in FIG. 2.

After testing, the MoSi$_2$ aerogel with P7×7 hierarchical pores in Example 3 had a water evaporation rate of 1.13 kg·m$^{-2}$·h$^{-1}$.

Figure 2:
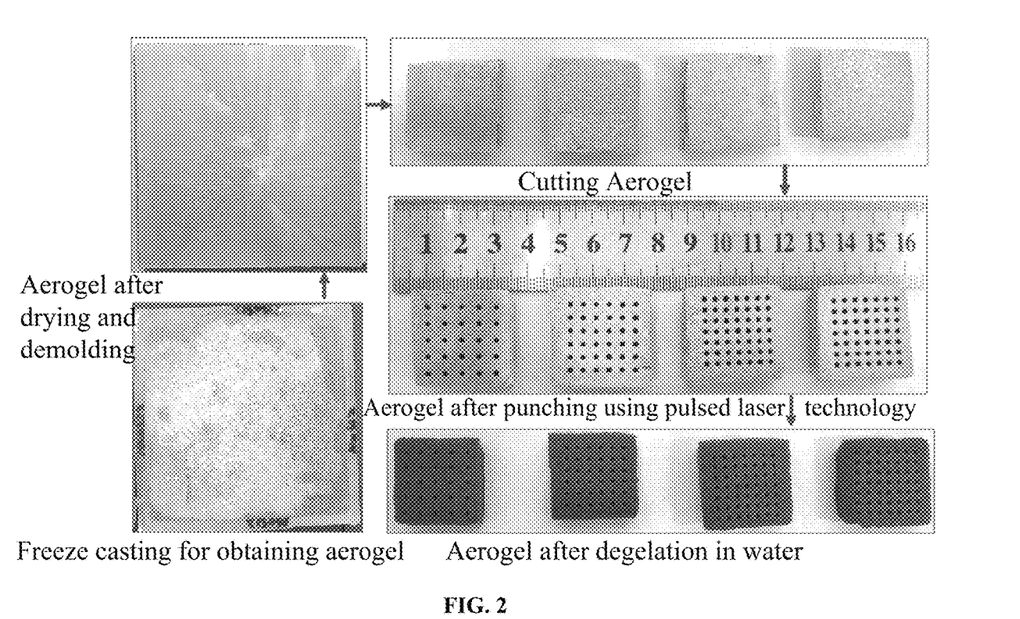
FIG. 2 shows macroscopic photos of the $MoSi_2$ aerogel with a millimeter-micron-nano hierarchical pore structure before and after punching using a pulsed laser in Examples 1 to 3 of the present disclosure.

FIG. 2 shows macroscopic photos of the MoSi$_2$ aerogel with a millimeter-micron-nano hierarchical pore structure before and after punching using a pulsed laser in Examples 1 to 3 of the present disclosure. As can be seen from FIG. 2, the MoSi$_2$ aerogel prepared in the present disclosure shows desirable macro formability, no cracks or obvious shrinkage deformation on the surface, and has good cutting and processing properties. After punching using a pulsed laser, no destructive phenomenon occurs in the aerogel, such as ablation and structural collapse. The aerogel still maintains stable macrostructural characteristics, even when the number of millimeter-scale pores increases and the pore shape changes, which achieves advantages of customized processing of a millimeter-scale pore pattern, adjustable number of pores, and controllable pore size distribution. After the MoSi$_2$ aerogel with hierarchical pore structure was soaked in water, the surface turned black due to the removal of gelatinization; however, the pore shape did not collapse, and the macroscopic shape of the aerogel was not damaged, proving that the aerogel with hierarchical pores maintain excellent strength and toughness.

Figure 3A:
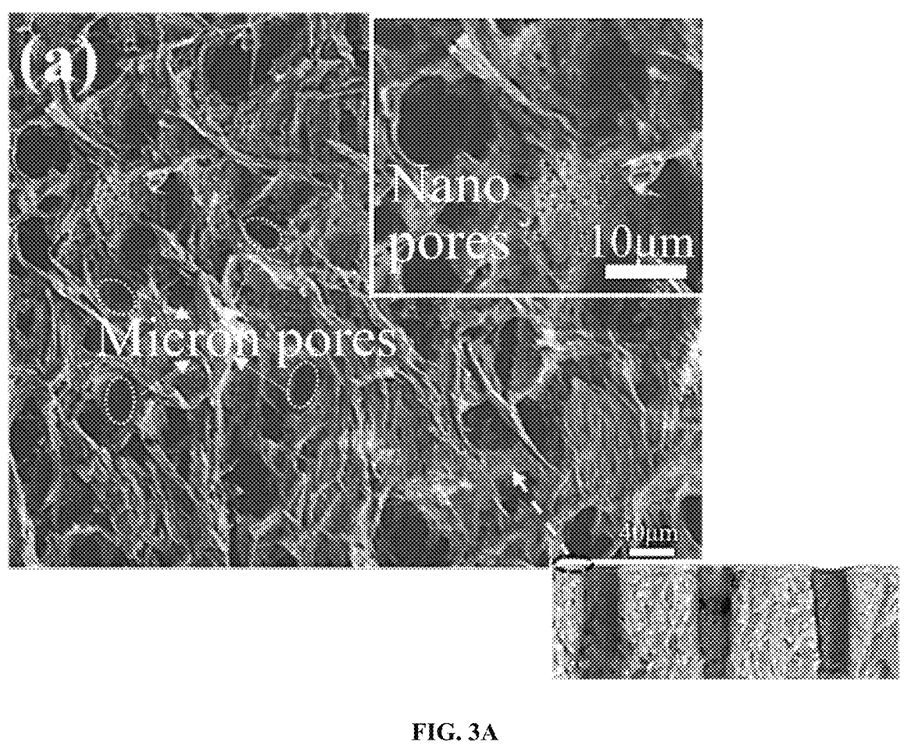
FIG. 3A represents a micron-nano pore structure on the surface of $MoSi_2$ aerogel.
Figure 3B:
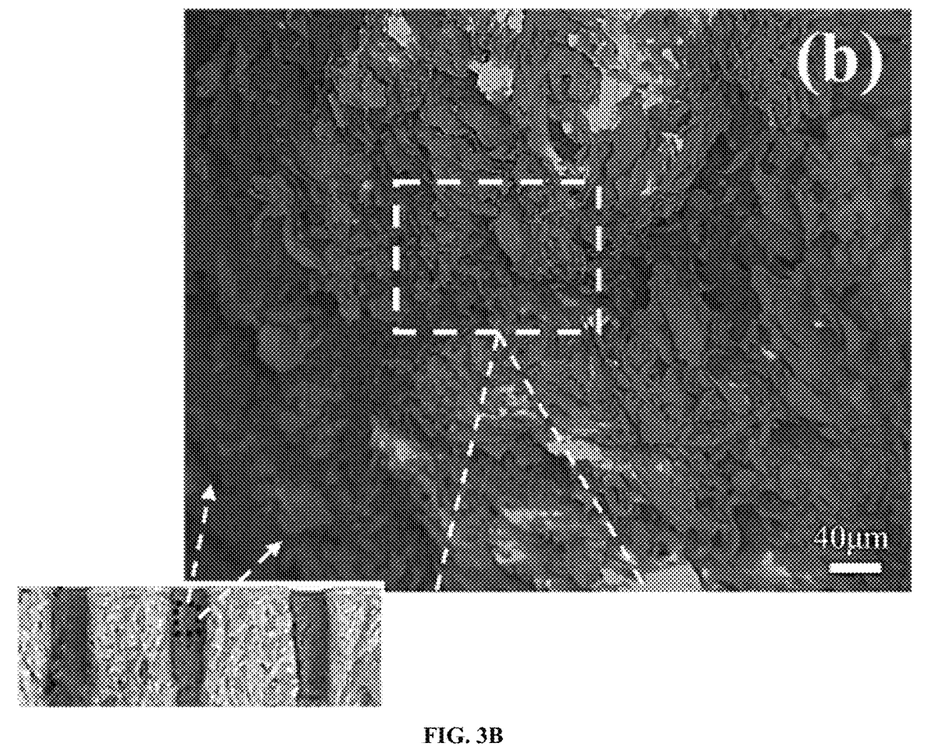
FIG. 3B represents a microstructure within millimeter-scale channels after punching of $MoSi_2$ aerogel.
Figure 3C:
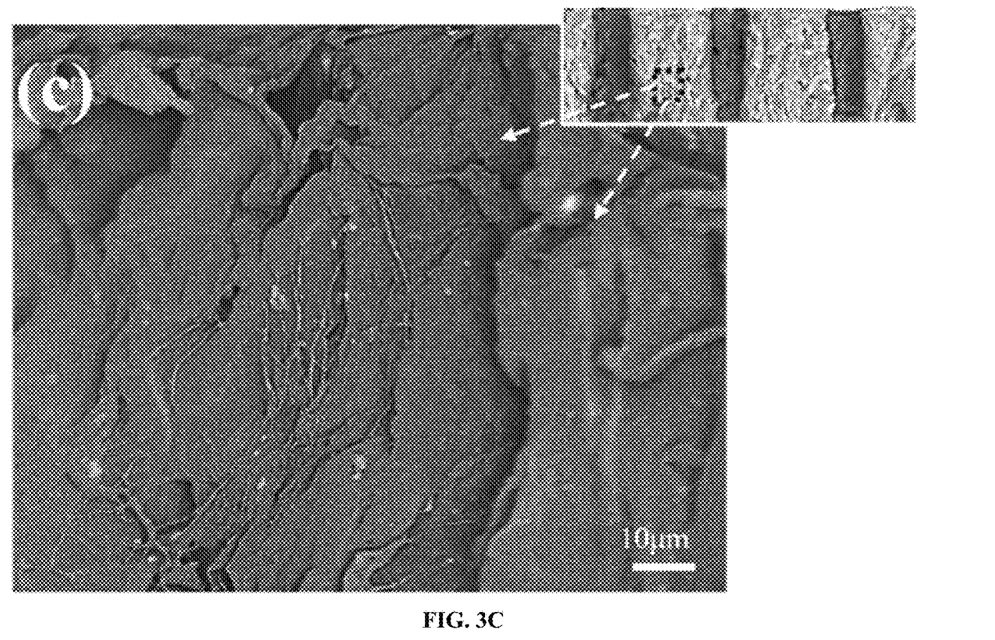
FIG. 3C represents an internal pore structure of the original $MoSi_2$ aerogel.
Figure 3D:
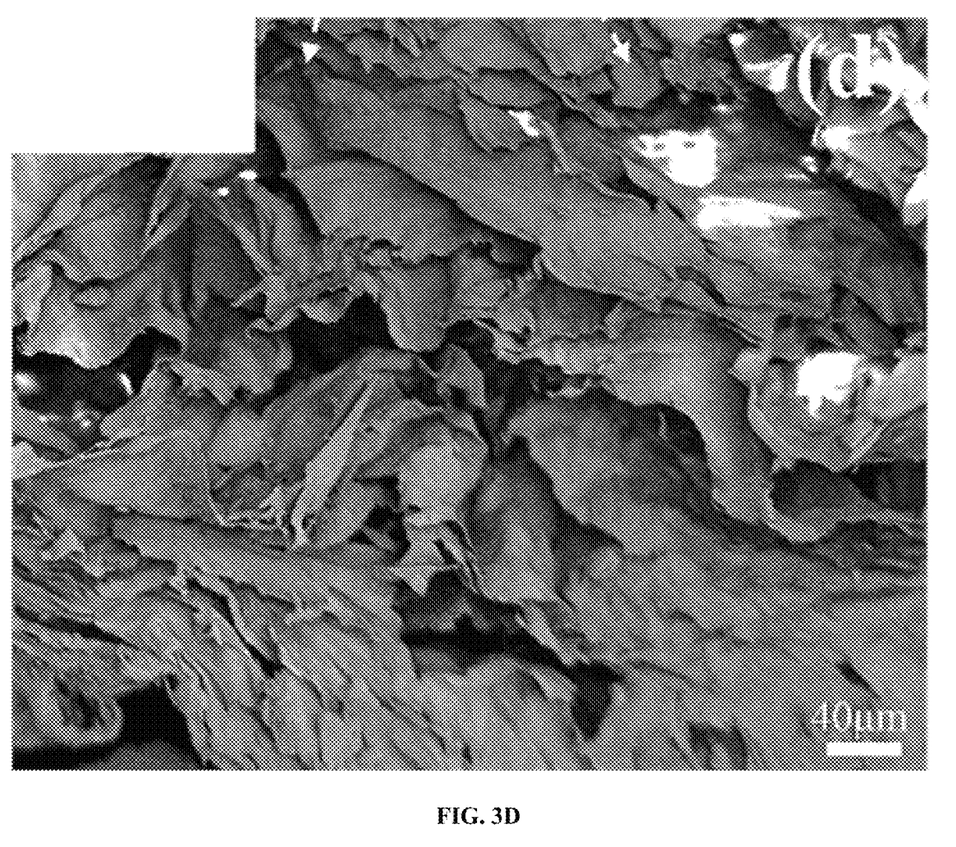
FIG. 3D represents an enlarged view of the microstructure within the millimeter-scale channels of $MoSi_2$ aerogel.

FIGS. 3A to 3D show SEM images of the $MoSi_2$ aerogel with a hierarchical pore structure in Example 1 of the present disclosure. As shown in FIG. 3A, there is an elliptical micronscale pore structure on the surface of $MoSi_2$ aerogel not punched using laser, with a large number of nanoscale pores evenly distributed on the network framework. As shown in FIG. 3B, after punching processing using pulsed laser, a framework of the through-pore is carbonized at high temperature, the surface turns black, and the cross-linking bonds are broken, forming a layered stacked microstructure. FIG. 3D shows a partially enlarged view of FIG. 3B, and shows that there are wrinkles on the surface of the fractured pore framework, as well as a gap structure assembled layer by layer. FIG. 3C shows the internal pore structure of $MoSi_2$ aerogel not punched using laser. As can be seen from FIG. 3C, the aerogel framework grew larger and has unidirectional pores.

Figure 4:
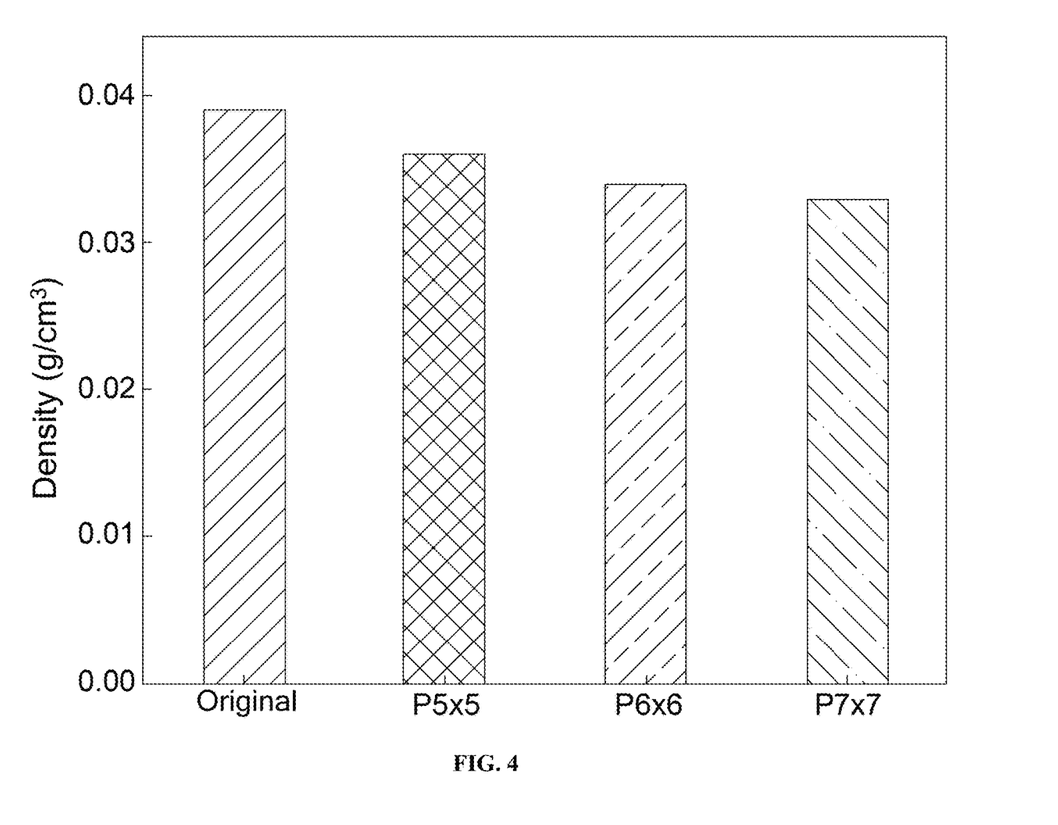
FIG. 4 shows densities of the original $MoSi_2$ aerogel and the $MoSi_2$ aerogels with a hierarchical pore structure synthesized in Examples 1 to 3 of the present disclosure.

FIG. 4 shows densities of the original $MoSi_2$ aerogel and the $MoSi_2$ aerogels with a hierarchical pore in Examples 1 to 3 of the present disclosure, which are 0.039, 0.036, 0.034, and 0.033 $g/cm^3$ respectively. As can be seen from FIG. 4, as the number of millimeter-scale pores in the aerogel increases, the density gradually decreases, with a small difference, indicating that punching using laser causes little impact on the mass of the aerogel.

Figure 5:
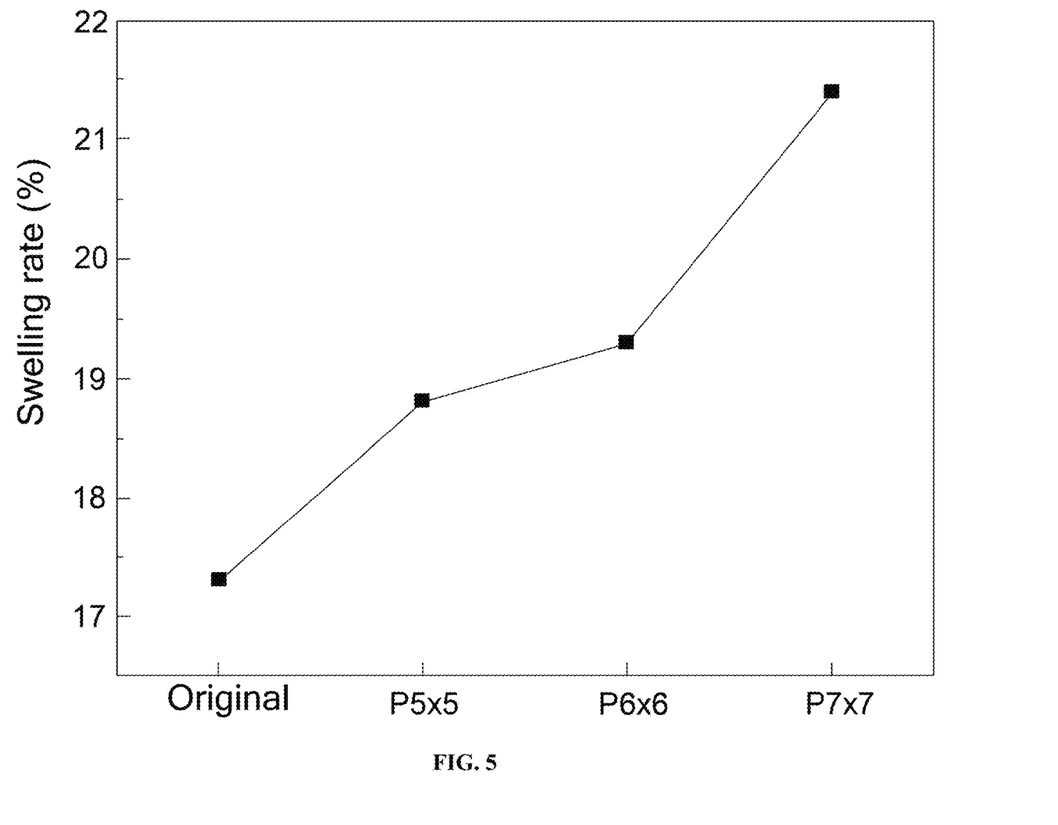
FIG. 5 shows swelling properties of the original $MoSi_2$ aerogel and the $MoSi_2$ aerogels with a hierarchical pore structure synthesized in Examples 1 to 3 of the present disclosure.

FIG. 5 shows swelling rates of the original $MoSi_2$ aerogel and the $MoSi_2$ aerogels with a hierarchical pore in Examples 1 to 3 of the present disclosure, which are 17.3%, 18.8%, 19.3% and 21.4% respectively. As can be seen from FIG. 5, as the number of millimeter-scale pores in the aerogel increases, the swelling rate gradually increases, proving that the water absorption capacity of the aerogel increases and the water saturation becomes higher. Compared with the original $MoSi_2$ aerogel with a larger degree of cross-linking, the millimeter-scale pores provide more penetration paths for aqueous solutions. Moreover, the broken cross-linking bonds reduce the penetration resistance of the aqueous solution, allowing the aerogel with hierarchical pore structure that includes more millimeter-scale pores to absorb more water during the same time period.

Figure 6A:
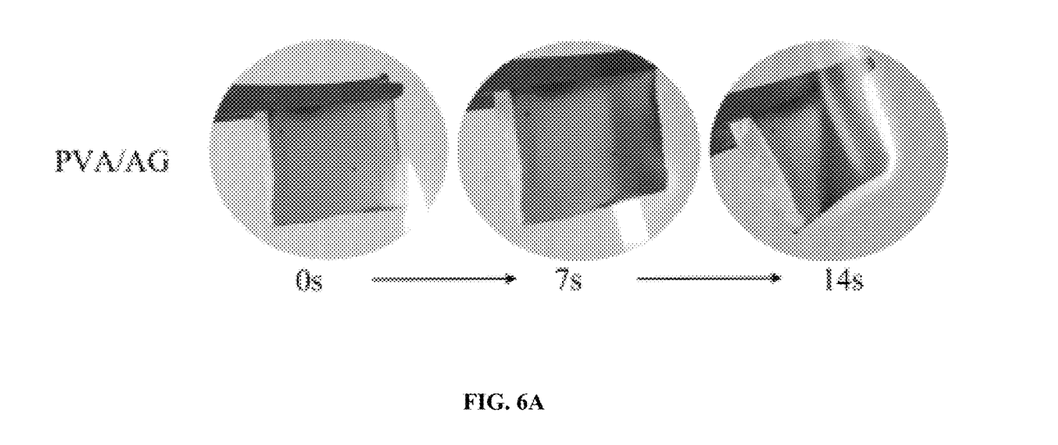
FIG. 6A and FIG. 6B show physical pictures of the aerogel before and after adding nano $MoSi_2$ material according to an embodiment of the present disclosure during a flame-retardant performance test, respectively.
Figure 6B:
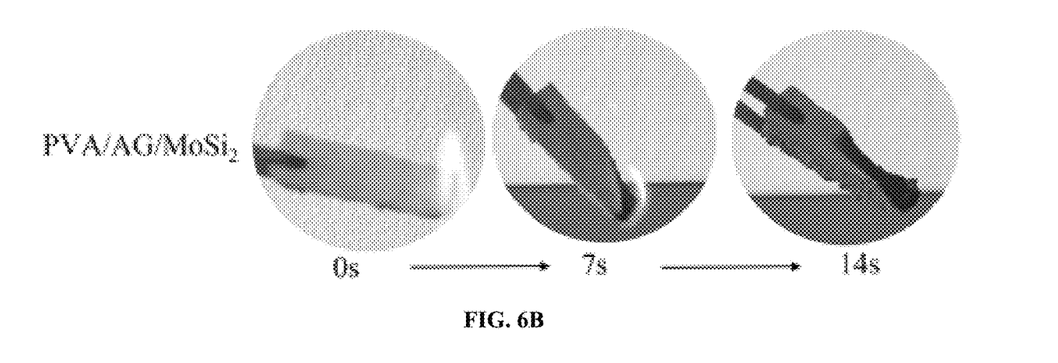

FIG. 6A and FIG. 6B show physical pictures of the aerogel before and after adding nano $MoSi_2$ material according to an embodiment of the present disclosure during a flame-retardant performance test, respectively. As can be seen from FIG. 6A and FIG. 6B, before adding $MoSi_2$ nanomaterials, the polyvinyl alcohol/agar aerogel is burned continuously within 14 s, while the burning of the polyvinyl alcohol/agar/$MoSi_2$ aerogel stops automatically at 14 s, proving that the addition of the nano $MoSi_2$ material enhances the flame-retardance of the aerogel. This may be because $MoSi_2$ exhibits high temperature stability and could act as a thermal insulator, forming a desirable physical barrier during the combustion, and thereby effectively preventing adjacent parts from continuing to burn.

Figure 7A:
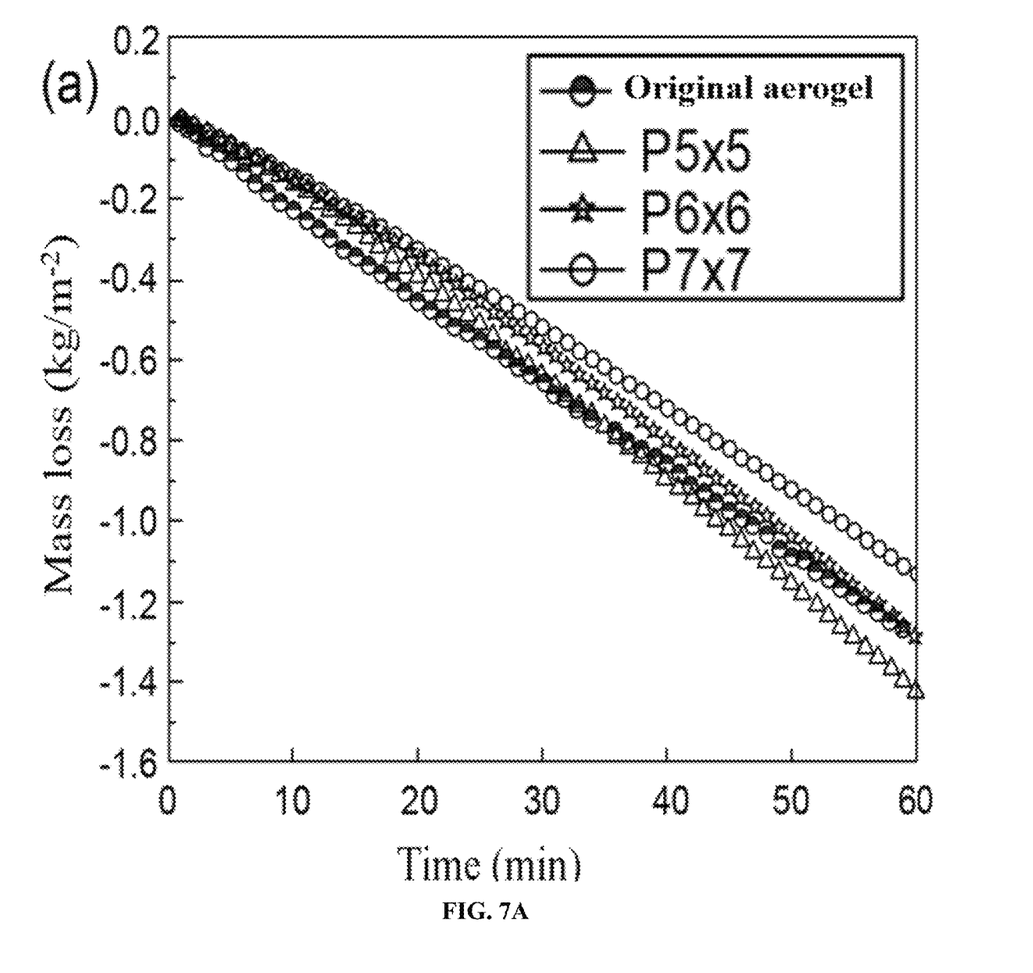
FIG. 7A and FIG. 7B show mass losses and evaporation rates of the original MoSi$_2$ aerogel and the MoSi$_2$ aerogels with a hierarchical pore structure synthesized in Examples 1 to 3 of the present disclosure under one sun illumination intensity within 60 min, respectively.
Figure 7B:
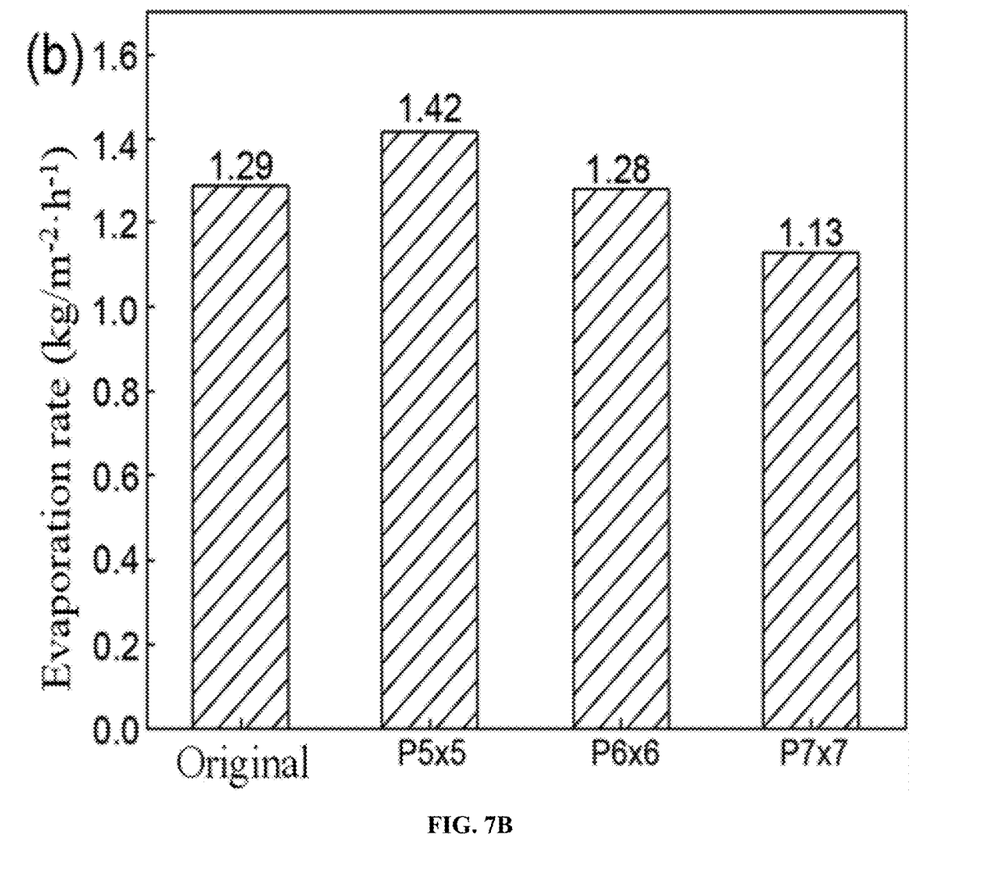

FIG. 7A and FIG. 7B show mass losses and evaporation rates of the original $MoSi_2$ aerogel and the $MoSi_2$ aerogels with a hierarchical pore structure synthesized in Examples 1 to 3 of the present disclosure under one sun illumination intensity within 60 min, respectively. As can be seen from FIG. 7A and FIG. 7B, for the original $MoSi_2$ aerogel, a rapid mass loss is maintained within the first 30 min of evaporation; however, from 30 min to 60 min, the mass loss slows down significantly. This was because the large cross-linking degree of the original $MoSi_2$ aerogel causes a low water supply, with a water supply rate lower than the evaporation rate. When the number of millimeter-scale straight through-pores was P5×5, the evaporation rate increases significantly due to the increased water supply rate. When the number of millimeter-scale straight through-pores further increases, the evaporation rate decreases because the increased number of millimeter-scale pores, results in a decreased light absorption area. It can be concluded that, by controlling the appropriate number of millimeter-scale pores, and minimizing area loss with a proviso of increasing water supply rate and ensuring water supply capacity, the solar evaporation performance of the $MoSi_2$ aerogels with a hierarchical pore structure is effectively improved.

Figure 8:
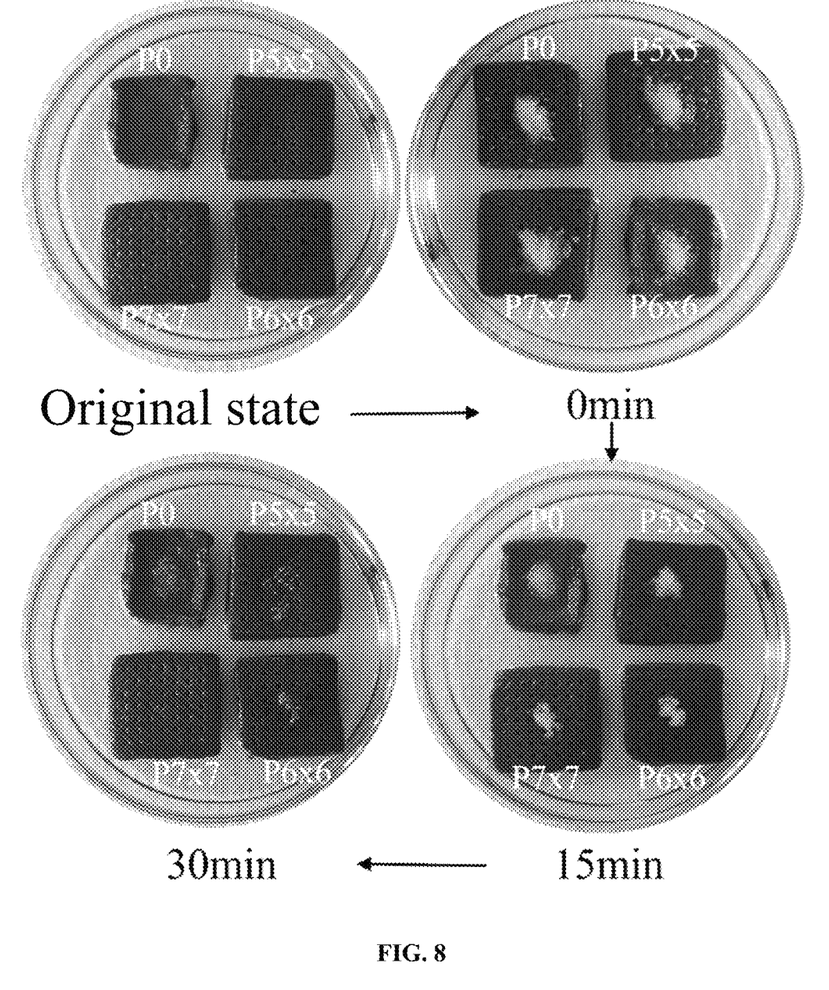
FIG. 8 shows physical pictures of the self-dissolution of salts over time in the original MoSi$_2$ aerogel and the MoSi$_2$ aerogels with a hierarchical pore structure synthesized in Examples 1 to 3 of the present disclosure.

FIG. 8 shows physical pictures of the self-dissolution of salts over time in the original $MoSi_2$ aerogel and the $MoSi_2$ aerogels with a hierarchical pore structure synthesized in Examples 1 to 3 of the present disclosure. As can be seen from FIG. 8, when salt is deposited on the surface of different aerogels, as time goes by, the salt dissolution efficiency ranks from high to low as follows: P7×7>P6× 6>P5×5>original $MoSi_2$ aerogel. Compared with the original aerogel of micro-nano structure, the increase in the number of millimeter-scale pores improves the internal mass transfer efficiency of $MoSi_2$ aerogel and endows it with a self-cleaning function. This further proves the necessity of designing and constructing an aerogel with a millimeter-micron-nano hierarchical pore structure.

The above are only specific examples of the present disclosure, but the scope of the present disclosure is not limited to these examples. Any change or replacement that could be conceived without creative labor should fall within the scope of the present disclosure. Therefore, the scope of the present disclosure should be subject to the scope defined by the claims.

What is claimed is:

1. An aerogel with a hierarchical pore structure formed using a pulsed laser technology, the aerogel being a silicon-containing inorganic-organic composite aerogel with a millimeter-micron-nano hierarchical pore structure, and being formed by subjecting a micron-nano silicon-containing inorganic-organic composite aerogel to customized millimeter-scale punching using a pulsed laser, wherein the micron-nano silicon-containing inorganic-organic composite aerogel is prepared by a process comprising:

mixing a nano silicon-containing inorganic material, a biomass polymer, and deionized water as a solvent to obtain a mixture, leaving the mixture to stand, and gelatinizing to obtain a nano silicon-containing inorganic-organic composite hydrogel, the biomass polymer comprising polyvinyl alcohol, agar, and glutaraldehyde; and freezing the nano silicon-containing inorganic-organic composite hydrogel to form ice crystals therein, and removing the ice crystals therein by freeze-drying to obtain the micron-nano silicon-containing inorganic-organic composite aerogel; and wherein a size, a shape, and a number of millimeter-scale pores in the aerogel with the hierarchical pore structure are controlled by the pulsed laser, thereby obtaining the silicon-containing inorganic-organic composite aerogel with the millimeter-micron-nano hierarchical pore structure.

2. The aerogel with the hierarchical pore structure formed using the pulsed laser technology as claimed in claim 1, wherein the nano silicon-containing inorganic material comprises at least one of $MoSi_2$, $SiO_2$, and $Si_3N_4$.

3. A method for preparing the aerogel with the hierarchical pore structure formed using the pulsed laser technology as claimed in claim 1, comprising the steps of:

step 1), preparing the nano silicon-containing inorganic-organic composite hydrogel, comprising:

providing polyvinyl alcohol and agar, adding deionized water thereto, and dissolving the polyvinyl alcohol and the agar by heating to obtain a homogeneous solution; adding a glutaraldehyde solution into the homogeneous solution, and subjecting a resulting mixture to cross-linking to obtain a cross-linked solution; adding a nano silicon-containing inorganic powder into the cross-linked solution to obtain a nano silicon-containing inorganic-organic composite colloidal sol; and leaving the nano silicon-containing inorganic-organic composite colloidal sol to stand, and gelatinizing to obtain the nano silicon-containing inorganic-organic composite hydrogel;

step 2), preparing the micron-nano silicon-containing inorganic-organic composite aerogel, comprising:

freezing the nano silicon-containing inorganic-organic composite hydrogel obtained in step 1) to form the ice crystals therein, and vacuum freeze-drying to remove the ice crystals and obtain the micron-nano silicon-containing inorganic-organic composite aerogel; and step 3), producing the silicon-containing inorganic-organic composite aerogel with a millimeter-micron-nano hierarchical pore structure, comprising:

subjecting the micron-nano silicon-containing inorganic-organic composite aerogel to punching processing using the pulsed laser technology to form the millimeter-scale pore structure, wherein the punching processing is performed by:

setting the pulsed laser with a frequency of 20 Hz, a pulse-width of 5,000 ps, a scanning speed of 50 mm/s to 150 mm/s, a laser power of 3% to 8%, and a laser spot of 1 mm; selecting a millimeter-scale pore shape; and punching the micron-nano silicon-containing inorganic-organic composite aerogel from top to bottom using a laser light source to form the millimeter-scale pores, wherein the size, the shape, and the number of the millimeter-scale pores in the aerogel with the hierarchical pore structure are controlled by the pulsed laser, thereby forming the silicon-containing inorganic-organic composite aerogel with the millimeter-micron-nano hierarchical pore structure.

4. The method as claimed in claim 3, wherein in step 1) the nano silicon-containing inorganic-organic composite colloidal sol comprises 1 wt % to 4 wt % of the polyvinyl alcohol, 1 wt % to 2 wt % of the agar, and 0.02 wt % to 1 wt % of the nano silicon-containing inorganic powder.

5. The method as claimed in claim 3, wherein in step 2) the nano silicon-containing inorganic-organic composite hydrogel is frozen at a temperature of −30° C. to −80° C.

6. The method as claimed in claim 3, wherein the millimeter-scale pore shape comprises at least one of a square, a circle, and a polygon.

7. The method as claimed in claim 3, wherein the nano silicon-containing inorganic powder comprises at least one of $MoSi_2$, $SiO_2$, and $Si_3N_4$.

8. A solar-driven method for desalinating seawater, comprising the steps of:

combining the aerogel with the hierarchical pore structure formed using the pulsed laser technology as claimed in claim 1, a polystyrene foam as a thermal insulation layer, and a fiber absorbent paper, and assembling into an evaporator, wherein the aerogel is to absorb solar energy, and the fiber absorbent paper is to transport seawater; and evaporating the seawater by using the evaporator to obtain fresh water.

* * * * *